(12) United States Patent
Discher et al.

(10) Patent No.: US 10,625,607 B2
(45) Date of Patent: Apr. 21, 2020

(54) VEHICLE DRIVETRAIN AND CLUTCH UNIT FOR DISTRIBUTING TORQUE

(71) Applicant: GKN Automotive Ltd., Redditch, Worcestershire (GB)

(72) Inventors: Frank Discher, Düsseldorf (DE); Kai Sorge, Sankt Augustin (DE)

(73) Assignee: GKN Automotive Ltd., Redditch, Worcestershire (GB)

( * ) Notice: Subject to any disclaimer, the term of this patent is extended or adjusted under 35 U.S.C. 154(b) by 215 days.

(21) Appl. No.: 15/747,495

(22) PCT Filed: Aug. 2, 2016

(86) PCT No.: PCT/EP2016/068396
§ 371 (c)(1),
(2) Date: Jan. 25, 2018

(87) PCT Pub. No.: WO2017/025382
PCT Pub. Date: Feb. 16, 2017

(65) Prior Publication Data
US 2018/0215260 A1    Aug. 2, 2018

(30) Foreign Application Priority Data

Aug. 7, 2015  (DE) .................. 10 2015 113 080

(51) Int. Cl.
*B60K 23/08*    (2006.01)
*B60W 50/00*    (2006.01)
(Continued)

(52) U.S. Cl.
CPC ............ *B60K 23/0808* (2013.01); *B60K 5/06* (2013.01); *B60W 10/02* (2013.01); *B60W 30/02* (2013.01);
(Continued)

(58) Field of Classification Search
None
See application file for complete search history.

(56) References Cited

U.S. PATENT DOCUMENTS 4,874,056 A * 10/1989 Naito ................. B60K 23/0808
180/233
4,989,686 A * 2/1991 Miller ................ B60K 23/0808
180/197
(Continued)

FOREIGN PATENT DOCUMENTS

DE    102010009665 A1    9/2011
DE    11 2012 001518 T5    1/2014
(Continued)

OTHER PUBLICATIONS

International Search Report and Written Opinion for PCT/EP2016/068396 dated Nov. 16, 2017 (14 pages; with English translation).

*Primary Examiner* — Justin Holmes
(74) *Attorney, Agent, or Firm* — Bejin Bieneman PLC

(57) ABSTRACT

Operating a drive train of a vehicle with a clutch unit for distributing torque on a primary axis and a secondary axis of the vehicle comprises: a) determining an available drive torque; b) determining excess torque on the primary axis; c) determining an actual maximum torque on the secondary axis; d) determining the excess torque on the secondary axis insofar as the maximum torque is not exceeded.

18 Claims, 4 Drawing Sheets

Figure 1:
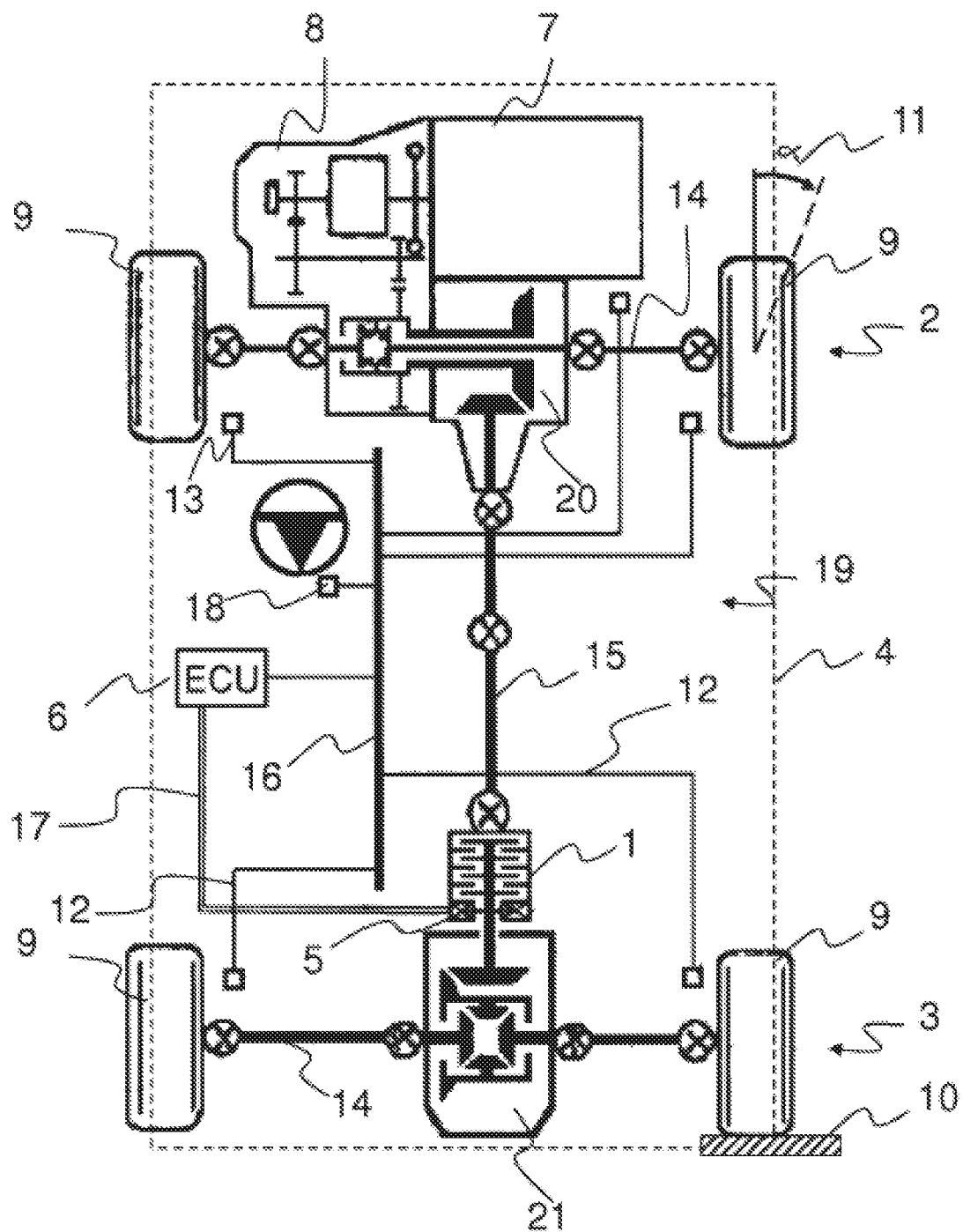

(51) Int. Cl.
*B60W 10/02* (2006.01)
*B60W 30/02* (2012.01)
*B60K 5/06* (2006.01)
*F16D 21/02* (2006.01)
*B60K 5/04* (2006.01)

(52) U.S. Cl.
CPC ......... *B60W 50/0098* (2013.01); *F16D 21/02* (2013.01); *B60K 5/04* (2013.01); *B60K 2023/0833* (2013.01); *B60W 2050/0012* (2013.01); *B60W 2520/263* (2013.01); *B60W 2720/403* (2013.01)

(56) References Cited

U.S. PATENT DOCUMENTS

| | | | | |
|---|---|---|---|---|
| 5,002,147 | A * | 3/1991 | Tezuka | B60K 23/0808 180/197 |
| 2006/0030974 | A1 | 2/2006 | Tsukasaki et al. | |
| 2008/0040011 | A1 * | 2/2008 | Vogel | B60K 23/0808 701/67 |
| 2014/0038763 | A1 * | 2/2014 | Knickerbocker | B60K 23/08 475/221 |
| 2014/0229071 | A1 * | 8/2014 | Kang | B62D 6/002 701/42 |
| 2014/0297145 | A1 * | 10/2014 | Nihanda | B60K 23/0808 701/69 |
| 2014/0297150 | A1 * | 10/2014 | Ohyagi | B60K 17/3505 701/89 |
| 2015/0019094 | A1 * | 1/2015 | Larkin | B60K 23/08 701/65 |
| 2015/0224875 | A1 * | 8/2015 | Feichtner | B60K 17/344 180/249 |
| 2016/0016465 | A1 * | 1/2016 | Cimatti | B60K 17/3515 180/247 |

FOREIGN PATENT DOCUMENTS

| | | |
|---|---|---|
| EP | 2591937 A1 | 5/2013 |
| EP | 2591940 A1 | 5/2013 |

* cited by examiner

VEHICLE DRIVETRAIN AND CLUTCH UNIT FOR DISTRIBUTING TORQUE

CROSS-REFERENCE TO RELATED APPLICATIONS

This application is a national stage of, and claims priority to, Patent Cooperation Treaty Application No. PCT/EP2016/068396, filed on Aug. 2, 2016, which application claims priority to German Application No. DE 10 2015 113 080.7, filed on Aug. 7, 2015, which applications are hereby incorporated herein by reference in their entireties.

BACKGROUND

Approaches for actuating an electronically controlled multi-disk clutch are known which are based mainly on consideration of a rotational speed difference, which can be application-dependent, at the input and output of the multi-disk clutch. Therefore, hitherto there has been a (subsequent) reaction to the currently present rotational speed difference. However, this has various disadvantages in terms of vehicle dynamics.

It is also to be taken into account that in known systems there is a distribution of the drive train torque to the axle which can be activated according to demand, or to the secondary axle, which is rigid or fixed in terms of its ratio, and this can give rise to a disproportionately high power transfer via the coupled drive train and therefore to increased fuel consumption and wear. This is not beneficial particularly with respect to the current ecological goals and the desired measures aimed at saving $CO_2$ on the part of automobile manufacturers.

SUMMARY

The present disclosure relates to a method for operating a drive train of a vehicle with a clutch unit for distributing torque at a primary axle and a secondary axle of the vehicle. The disclosure relates to, in particular, a method for vehicle dynamics control in demand-oriented all-wheel systems, and in this context basically to all vehicles in which information is available relating to the current engine torque, the longitudinal acceleration and/or the transverse acceleration, the yaw rates (i.e., the speed of the rotation of a vehicle about the vertical axis), and the wheel rotational speeds. The disclosure relates in this respect to, in particular, all-wheel-driven vehicles in which either the rear axle or the front axle can be activated by means of an electronically controlled clutch unit. The clutch unit is, in particular, an electronically controlled multi-disk clutch.

Accordingly, specified herein is a method for operating a drive train of a vehicle in which the distribution of torque to a primary axle and a secondary axle of the vehicle is configured in a particularly efficient way in terms of vehicle dynamics aspects and/or environmental criteria. The method is intended also to lead, in particular, to a situation in which a high degree of traction and vehicle dynamics are ensured in the boundary region, wherein at the same time a minimum deployment of power and minimum losses in the drive train are to be accepted.

Thus, a method for operating a drive train of a vehicle with a clutch unit contributes to distributing torque at a primary axle and a secondary axle of the vehicle, wherein the method comprises at least the following steps:
(a) determining an available drive torque;
(b) determining excess torque at the primary axle;
(c) determining a current maximum torque at the secondary axle; and
(d) making available the excess torque to the secondary axle in so far as said excess torque does not exceed the maximum torque.

The method is based, in particular, on a comparison of the drive torque which is currently present at the output side of the transmission and the drive torque which is made available to the vehicle with the torque which can be potentially output at the primary axle. The difference between the two torques can or must then be passed on to the secondary axle. With the method proposed here, it is, in particular, ensured that, on the one hand, the most precise possible information about the drive torques which are made available by the engine are present, in particular taking into account the driver's requirement and, on the other hand, the torque which can be output at the primary axle is also estimated as precisely as possible. This method permits, in particular, an electronically controlled multi-disk clutch in the clutch unit to be actuated predictively in such a way that as little all-wheel torque as possible, but as much is as necessary, is transmitted to the attached secondary axle by the drive train.

According to step (a), firstly a determination of drive torque that is currently available for the drive train is carried out. For this purpose, in particular there is a determination of which drive torque is made available to the drive train at the output of the transmission. For this purpose, sensory measurement data, characteristic diagrams etc. can be used. In particular, the currently available drive torque is calculated. The drive torque is calculated, in particular, on the basis of an engine torque which is made available by the driver of the vehicle. In this context, a differentiation is made between the driver's request torque (engine setpoint torque) and the current engine torque. The difference between the two signals in terms of timing permits predictive actuation of the actuator element for the operation of the clutch unit and considerably improves the overall driving behavior of the all-wheel system, particularly in the vehicle dynamics boundary region. Since the driver's torque request usually has significant deviations in the upward direction from the engine torque which is actually made available, the current engine torque is also considered in order to improve the accuracy.

According to step (b), an excess torque is determined at the primary axle. For this purpose there is a calculation, in particular, of which torque can currently actually be implemented by the axle which is driven in a primary fashion into a proportion movement of the vehicle, and this is compared with the drive torque which is made available by the drive. An excess torque can be identified in so far as the drive torque is actually greater than the torque which can be implemented as propulsion at the axle which is driven in a primary fashion. This excess torque would therefore basically be freely available for the drive of the secondary axle.

According to step (c) there is a determination of a maximum torque that can currently actually be implemented as propulsion movement at the secondary axle. This current maximum torque can also be determined or calculated at the secondary axle.

According to step (d), the excess torque which cannot be converted at the primary axle is then transmitted in the secondary axle, but only to a sufficient extent that the maximum torque which actually be converted there is not exceeded. In this respect, step (d) makes available a limitation of the torque distributed to the secondary axle, as a function of the currently maximum convertible amount.

In step (a) it is possible that at least one of the following processes is included:
a.1 determining operating parameters of an engine of the vehicle,
a.2 determining an input torque at the transmission,
a.3 determining the available drive torque from the input torque at the transmission.

From the signals of the engine controller which are present in the vehicle it is possible to calculate, for example, an engine torque which corresponds very precisely to the conditions at the input of the transmission. By means of a gear speed detection system in a manual transmission or corresponding transmission information in an automatic transmission it is possible for the torque which is present at the transmission input to be converted into an output torque. This drive torque is available in the vehicle and can be distributed according to demand to the primary and secondary axles of the vehicle.

When the step (b) is carried out, at least one of the following processes can be included:
b.1 determining a torque which is required at the primary axle or a torque which can be implemented,
b.2 determining the excess torque taking into account the available drive torque, on the one hand, and the torque which is required or can be implemented at the primary axle, on the other hand.

The axis torque which can be passed onto the secondary axle by means of the clutch unit which can be activated according to demand ("on-demand" clutch) can be calculated by means of estimating the transmittable torque at the primary axle. On the basis of the consideration of the engine torque which is requested by the driver, the clutch unit can be actuated predictively, with the result that a difference in rotational speed cannot arise between the primary axle and the secondary axle.

In order to estimate the loads or torques which can be implemented at the primary axle and also at the secondary axle, it is possible to use a vehicle calculation model, wherein the axle load distribution and the wheel load distribution of the secondary axle can be determined by means of, for example, simple, geometric relationships and a number of vehicle operating parameters.

In addition, it is possible that step (c) comprises at least one of the following processes:
c.1 determining the current maximum torque at the secondary axle taking into account at least one of the following parameters: steering angle, transmission, vehicle dynamics range;
c.2 determining the current maximum torque at the secondary axle taking into account the coefficient of friction between the wheel and underlying surface,
c.3 determining the current maximum torque at the secondary axle taking into account a difference in rotational speed between the primary axle and secondary axle, and
c.4 determining the current maximum torque at the secondary axle taking into account a thrust distribution at all the wheels of the primary axle and secondary axle.

It is possible that at least two of the processes c.1 to c.4 are carried out, and even three or even all four processes.

It is possible that a coefficient of friction between the wheel and the underlying surface serves as a control variable for the distribution of torque to a primary axle and a secondary axle of the vehicle and is adapted abruptly or actuatively as a function of current operating parameters of the vehicle.

It can also be provided that a rate of change of the adaptation of the coefficient of friction is variable.

In addition it is advantageous that a ratio of the torque at a primary axle with respect to the torque at a secondary axle is set in a variable fashion as a function of a coefficient of friction between the wheel and the underlying surface. In particular the following is to be noted with respect to the use of the parameters given above and, in particular, with respect to the coefficient of friction.

The geometry data with respect to the wheel or the wheels of the vehicle are usually known. Taking this as a basis, it is possible to carry out an estimation of the current coefficient of friction by taking into account various current or calculated operating parameters of the vehicle and/or measurement data of associated sensor systems. For this purpose, the following mechanisms can be used:

1. A vectorial addition of longitudinal accelerations and transverse accelerations at the vehicle supplies a basic coefficient of friction which is currently being used by the vehicle. This value forms the basis of an estimation. The further mechanisms which are presented below can generally not undershoot this basic coefficient of friction which is determined in this way. The basic coefficient of friction which is determined in this way is increased intermittently or continuously (with what is referred to as a drag pointer function); possibly quickly above a freely settable limit (high coefficient of friction range) and more slowly below this freely settable limit (low coefficient of friction range).
2. In the event that a difference in yaw rate (difference between the currently present yaw rate and the setpoint yaw rate) is detected, the drag pointer function is bypassed and a significantly more rapid reduction to the basic coefficient of friction (again) takes place. This approach is based, in particular, on the assumption that an understeer reaction or oversteer reaction of the vehicle is directly associated with the exceeding of the static friction either at the front axle or at the rear axle. In the yaw rate comparison, the currently measured vehicle yaw rate is compared with the yaw rate which is calculated from the single-track model (which is stored in the controller and with which a person skilled in the art is familiar).
3. In the event that slip (difference between the speeds of mechanical elements which are in frictional contact with one another: here the wheel and the underlying surface), which results from the present drive torque, occurs at the axle which is driven in a primary fashion, a coefficient of friction is determined directly by means of the estimated axle load, the wheel diameter and the drive torque.
4. Two controller modules are then also coupled to one another. The magnitude of the torque which can be output at the axle which is driven in a primary fashion, and therefore directly also the torque which is to be conducted to the axle which is driven in a primary fashion, are influenced by the estimated coefficient of friction. The lower the coefficient of friction at the primary axle, the more torque can/must be conducted to the axle which is driven in a secondary fashion. The mechanism firstly defines the coefficient of friction of the secondary axle, if appropriate also as a function of the other three mechanisms above. This assumed coefficient of friction gives rise to an excess torque at the axle which is driven in a secondary fashion. As soon as this excess torque has been set and further boundary conditions are satisfied, the coefficient of friction is increased slowly; until the second large controller module—the slip controller—engages here.

It is possible that the distribution of torque to a primary axle and a second axle of the vehicle is also performed at any rate in the overrun mode. The term overrun mode refers in a motorized vehicle to the driving state in which, at times of non-separated torque transmission (for example with clutch not being actuated) the engine is towed by the vehicle, that is to say kept in rotational motion.

The method can be configured in such a way that (if appropriate as well as the current engine torque) an engine torque requested by the driver (or driver's requested torque or engine setpoint torque) (also additionally) sensed and taken into account, wherein the clutch unit is actuated predictively or in advance. Since the engine setpoint torque is currently not yet present but is to be present in the future, the activation, based thereon, of the clutch unit can take place chronologically in advance. This can take place in such a way that a rotational speed difference does not come about between the primary axle and the secondary axle. This method permits, in particular, an electronically controlled multi-disk clutch in the clutch unit to be actuated predictively or in advance in such a way that as little all-wheel torque as possible, but as much as is necessary, is transmitted to the attached secondary axle by the drive train.

The present subject matter can be applied, in particular, in a vehicle with a device for the variable distribution of torque to different axles of the vehicle, wherein the device is suitable and configured for carrying out the method described here.

SUMMARY OF THE DRAWING FIGURES

Figure 2:
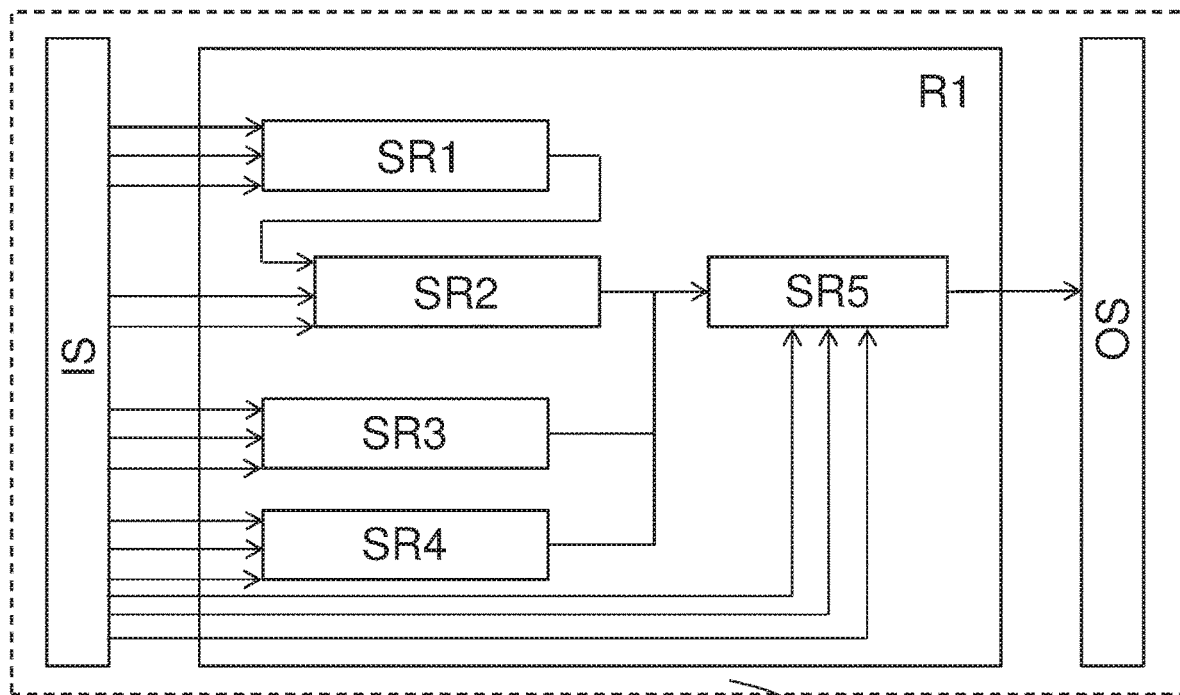
Figure 3:
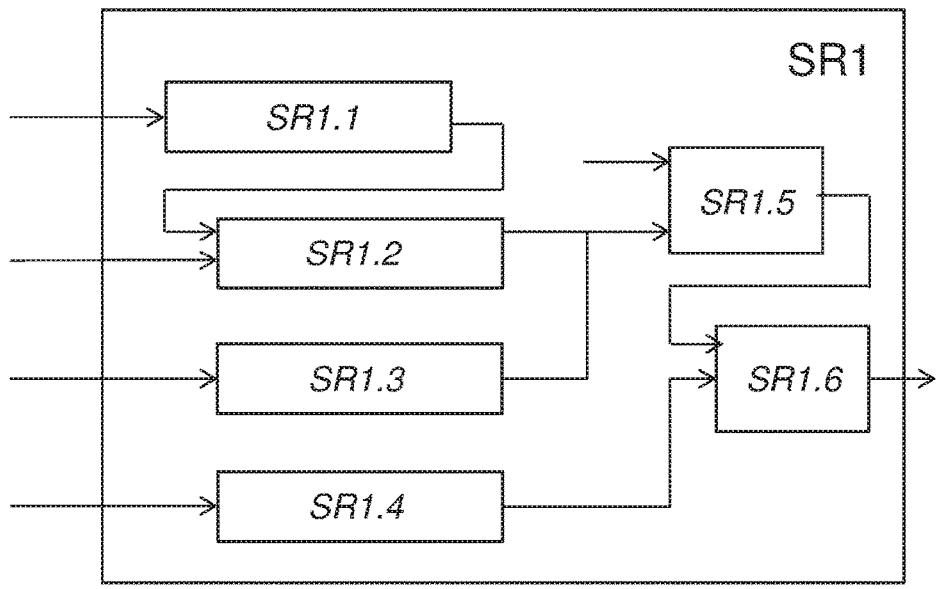
Figure 4:
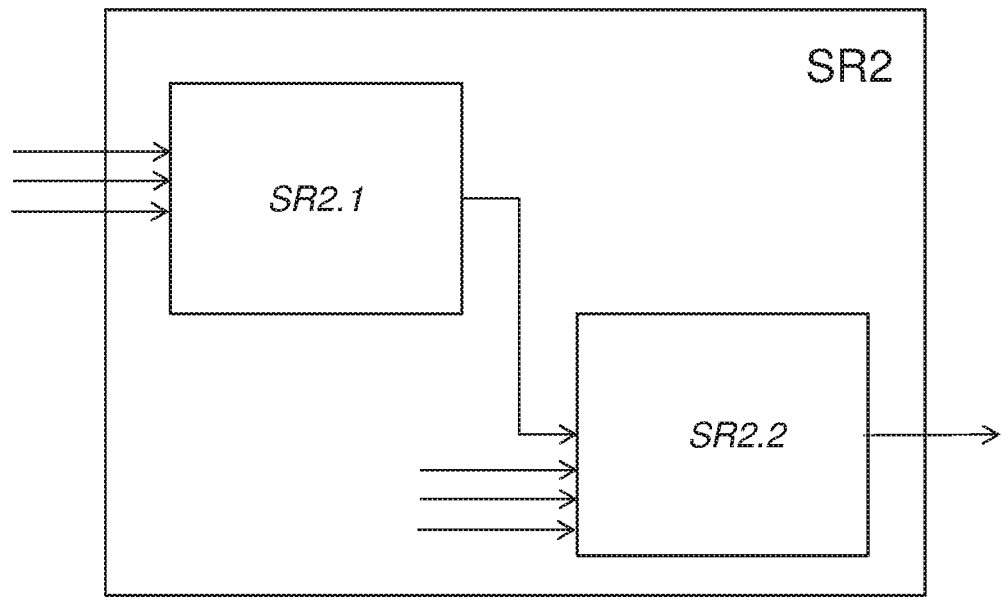
Figure 5:
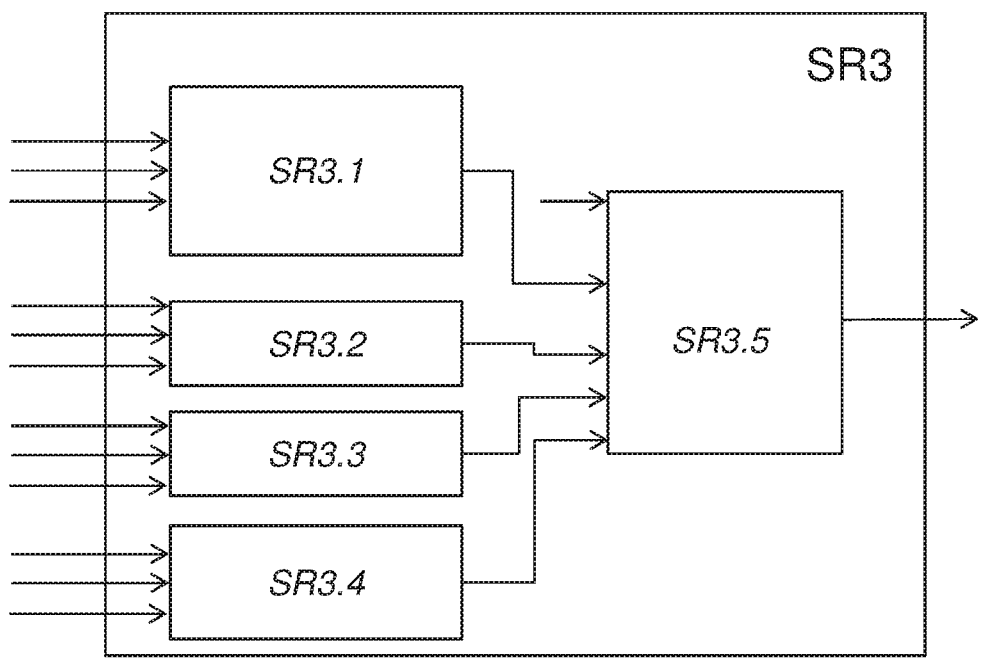
Figure 6:
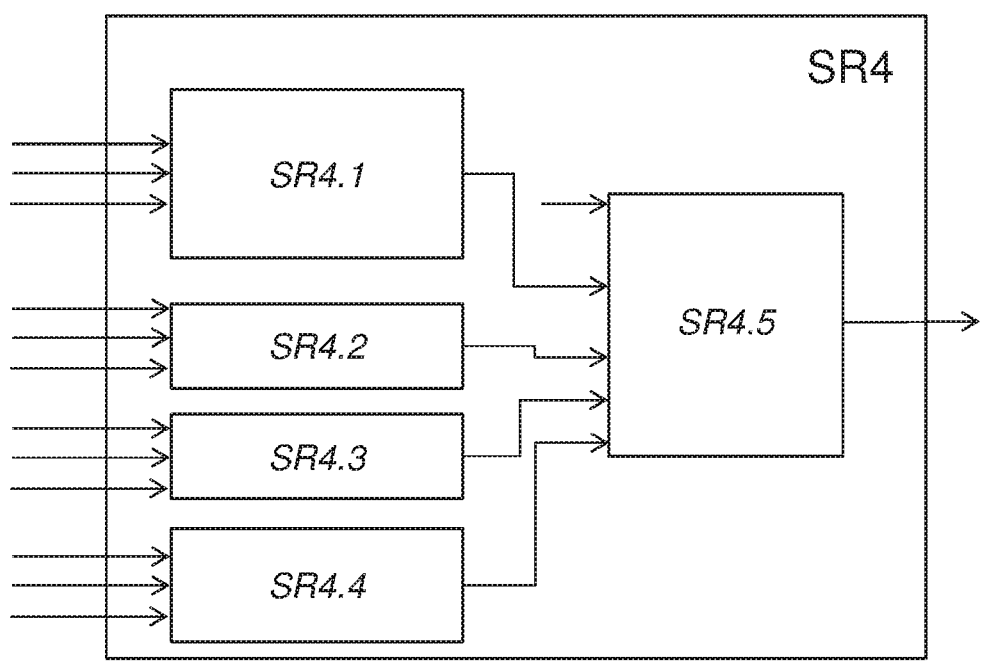

The disclosure is explained in more detail below with reference to the figures. It is to be noted that the disclosure is not intended to be limited by the exemplary embodiment shown. In particular, it is, unless explicitly stated otherwise, also possible to extract partial aspects of the substantive contents explained in the figures and combined with other components and realizations from the present description. In the drawings, in each case in a schematic form:

FIG. 1: shows a vehicle with an exemplary device for the variable distribution of torque to different axles of the vehicle, FIG. 2: shows a control concept with a plurality of modules for illustrating the exemplary method, FIG. 3: shows the illustration of a first module, FIG. 4: shows an illustration of a second module, FIG. 5: shows the illustration of a third module, and FIG. 6: shows the illustration of a fourth module.

DETAILED DESCRIPTION

FIG. 1 is a schematic view of the design of a vehicle 4 with respect to the component which is relevant to the operation of the drive train 19. The vehicle 4 has an engine 7 (operated with fuel and/or electrically), to which a transmission 8 is directly assigned. Arranged downstream of the transmission 8 is a transfer case 20 which divides the drive torque of the transmission 8 in a predetermined symmetrical or asymmetrical ratio between a front primary axle 2 and a rear secondary axle 3 of the vehicle 4. The drive torque is in this way transmitted to the wheels 9 of the vehicle 4 via the side shafts 14, or the longitudinal shaft 15.

A clutch unit 1 is also provided. The clutch unit 1 is connected upstream of, for example, a rear differential gear mechanism 21, and has a multi-disk clutch and externally controllable activation units 5 for performing activation and deactivation. Of course, the clutch unit 1 can also be arranged at another location within the drive train, for example at the front of the connection, or integrated in the transfer case 20. The activation unit 5 is controlled by an electronic control unit or device 6 which correspondingly outputs electrical control currents to the activation unit 5 via corresponding activation lines 17. In order to transmit electrical signals from and to the control unit or device 6 a serial BUS arrangement 16 is provided which can be embodied, for example, as a CAN (controller area network)-BUS. Interfaces, protocols and electrical circuitry for the signal transmission on an CAN-BUS are known and do not have to be explained in more detail here. Of course, as an alternative to a BUS arrangement 16, an individual wiring arrangement of the various electrical components of the vehicle to the control unit can also be provided. The control unit comprises a stored-program microprocessor and an electronic memory in which a control program is stored. In this context, corresponding control signals for the activation unit 5 are generated by the microprocessor in accordance with a control program. For the generation of corresponding control signals, the control unit depends on information about various operating parameters of the vehicle. For this, the control unit can access, via the BUS arrangement 16, various signals which are representative of these operating parameters. In particular wheels sensors 13 are provided for a (each) wheel, as well as steering sensors 18, are provided for detecting a steering angle 11 of the vehicle and are connected (via signal conductor 12) to the control unit or device 6 via the BUS arrangement 16.

FIG. 2 illustrates a control concept (R1) to which various input signals (IS) are made available, for example by measured value pickups, or sensors on the vehicle, which control concept (RI) comprises various modules (SR1, SR2, SR3, SR4, SR5) and generates an output signal for the operation or the activation of a clutch unit (OS). The control concept (RI) provided here, in particular, that new information is transferred from the module SR1 into the module SR2, and then the results from the modules SR2, SR3 and SR4 are then input together to the analysis and output module SR5 which then finally predefines and/or sets the transmission ratio which is to be currently set with respect to the distribution of torque to the secondary axle.

The module SR1 relates, in particular, to what is referred to as a preemptive torque module (PTM) which calculates an excess torque from the explained torque comparison at the axle which is driven in a primary fashion and is passed on with preemptive control (over time) to the axle which is driven in a secondary fashion.

The module SR2 is what is referred to as a preemptive limitation module (PLM) which limits the preemptively limited excess torque to the secondary axle as a function of, e.g., the steering angle, of the current transmission gear speed, and/or of the distance between the current driving situation and the vehicle movement dynamic limiting range (as a function of the current coefficient of friction). This occurs, in particular, in a self-adjusting or automatic fashion (preferably without new acquisition of data for the values of the operating parameters of the vehicle).

The module SR3 relates, in particular, to a traction control module (TCM) which monitors the difference in rotational speed between the primary axle and the secondary axle.

The concept R1 also comprises the module SR4, in particular what is referred to as a vehicle dynamics module (VDM), which monitors the distribution of the thrust to all the wheels. In this context it is ensured, in particular by means of a yaw rate comparison, that the vehicle has not reached an unstable driving state.

The subject matter of module SR4 can additionally be an off-road function which, in the event of undesired slipping back of the vehicle, attempts to transmit a predefinable clutch braking torque from the front axle to the rear axle which is subject to greater loading. As a result, the controllability and therefore also the driving safety are increased in a targeted fashion.

FIG. 3 serves to illustrate the module SR1. The module is composed, in particular, of the following subsystems:
- a subsystem SR1.1 which defines the coefficient of friction for the special situations of "driving off" (if appropriate setting a predefinable coefficient of friction),
- a subsystem SR1.2 which calculates the transmitted torque at the front axle (if appropriate on the basis of determined operating parameters such as transverse acceleration, longitudinal acceleration and/or axle load at the front axle),
- a subsystem SR1.3 which calculates the transmitted torque at the rear axle (if appropriate on the basis of determined operating parameters such as transverse acceleration, longitudinal acceleration, wheel speed, all-wheel operating mode and/or axle load at the rear axle),
- a subsystem SR1.4 which parameterizes a basic torque (if appropriate on the basis of determined operating parameters such as transmission situation, speed of the vehicle, steering angle and/or all-wheel operating mode),
- a subsystem SR1.5 in which the excess torque is determined (if appropriate on the basis of results of the subsystems SR1.1 to SR1.4 as well as determined operating parameters such as driver's request torque and torque which can be currently supplied), and
- a subsystem SR1.6 in which the torques of the various modules are combined.

The requested torque is then to be limited for various reasons, and this is a task which is performed by the module SR2 which is illustrated schematically in FIG. 4. In the subsystem SR2.1, the torque which is made available by the module SR1 is differentiated in particular, on the one hand, by means of the steering angle and the velocity of the vehicle and, on the other hand, between normal travel and special travel (e.g. off-road travel), and is correspondingly limited. In this subsystem SR2.2, a limitation is additionally imposed as a function of the gear speed and it is simultaneously decided whether the vehicle is traveling straight ahead (strong limitation), is at the limit at a low coefficient of friction (medium limitation) or at the limit at a high coefficient of friction (no limitation). Here, the preemptive control component can be intelligently reduced and limited as a function of the situation and to a coefficient of friction. In addition, it is possible to predefine various further parameters whose torque limitation can also be executed differently.

FIG. 5 illustrates the module SR3, specifically a slip controller which is composed, for example, of a PI (proportional-integral) controller which uses as an input variable the compensated wheel rotational speed difference between the primary axle and the secondary axle. In addition to the PI controller which is accommodated in the subsystem SR3.5, this module mainly brings about compensation of the difference in rotational speed, which is performed in the subsystem SR3.1. In this module, e.g. one or more of the following compensations is performed:
- compensation of the traction slip over the velocity,
- compensation of the geometry of the vehicle (natural slip) over the speed of the vehicle and limit,
- compensation on the basis of the setpoint slip over the speed of the vehicle and limit,
- compensation of understeering, cross-fading onto the front wheel on the outside of the bend.

In addition to the calculation of the setpoint slip, limitations of the lower control output (SR3.3) and upper control output (SR3.4) are also included here, as well as a "reset" condition for the I component of the PI controller (SR3.2).

FIG. 6 also shows a basic design of the module SR4. This module combines various functions and brings about optimum distribution of the driving torque. This module is composed essentially of a PI traction controller (SR4.4) and a preemptive control torque component (SR4.1) which is faded in and out by means of a yaw rate comparison. The yaw rate comparison of the theoretical yaw rate and current yaw rate ensure that torque is transmitted to the secondary axle in the overrun mode of the vehicle only for as long as the vehicle can be considered to be stable. As soon as an unstable state of the vehicle is detected in the overrun mode by means of the comparison, the preemptive control torque and therefore also the rotational-speed-dependent component are faded out.

In addition to the yaw rate range, SR4.1 can also specify and adjust the level of the preemptive control torque, the speed range and various further modes. In addition, in the subsystem SR4.2 there is a function which is focused specifically on driving off road. If the vehicle comes to a standstill on an incline under off road conditions and the driver then signals, by engaging the reverse gear speed, that he would like to move backwards again in a controlled way, a constant torque is made available to the secondary axle via a situation detection means, said constant torque preventing the front axle which is relieved of loading from locking as a result of the at least rigid braking force distribution, so that the vehicle becomes uncontrollable. In addition, the braking volume which is present at the front axle is therefore also transferred to the rear axle. The vehicle can be controlled significantly more easily and can be moved cleanly down the incline again.

LIST OF REFERENCE NUMBERS

1 Clutch unit
2 Primary axle
3 Secondary axle
4 Vehicle
5 Activation unit
6 Device
7 Engine
8 Transmission
9 Wheel
10 Underlying surface
11 Steering angle
12 Signal conductor
13 Wheel sensor
14 Side shaft
15 Longitudinal shaft
16 BUS arrangement
17 Activation line
18 Steering sensor
19 Drive train
20 Transfer case
21 Differential gear mechanism

The invention claimed is:
1. A method for operating a drive train of a vehicle with a clutch unit for distributing torque at a primary axle and a secondary axle of the vehicle, wherein the method comprises at least the following steps:
   (a) determining an available drive torque;

(b) determining excess torque at the primary axle;
(c) determining a current maximum torque at the secondary axle; and
(d) making available the excess torque to the secondary axle in so far as said excess torque does not exceed the current maximum torque;
wherein an engine torque which is requested by the driver is detected and taken into account, wherein the clutch unit is actuated predictively.

2. The method of claim 1, wherein step (a) comprises at least one of the following processes:
   a.1 determining operating parameters of an engine of the vehicle,
   a.2 determining an input torque at the transmission, and
   a.3 determining the available drive torque from the input torque at the transmission.

3. The method of claim 1, wherein step (b) comprises at least one of the following processes:
   b.1 determining a torque which is required at the primary axle or a torque which can be provided, and
   b.2 determining the excess torque taking into account the available drive torque and the torque which can be provided at the primary axle.

4. The method of claim 1, wherein step (c) comprises at least one of the following processes:
   c.1 determining the current maximum torque at the secondary axle taking into account at least one of the following parameters: steering angle, transmission, vehicle dynamics range;
   c.2 determining the current maximum torque at the secondary axle taking into account the coefficient of friction between the wheel and underlying surface,
   c.3 determining the current maximum torque at the secondary axle taking into account a difference in rotational speed between the primary axle and secondary axle, and
   c.4 determining the current maximum torque at the secondary axle taking into account a thrust distribution at all the wheels of the primary axle and secondary axle.

5. The method of claim 4, wherein at least two of the processes c.1 to c.4 are carried out.

6. The method of claim 1, wherein a coefficient of friction between the wheel and underlying surface serves as a control variable for the distribution of torque to a primary axle and a secondary axle of the vehicle and is adapted abruptly or iteratively as a function of current operating parameters of the vehicle.

7. The method of claim 6, wherein a rate of change of the adaptation of the coefficient of friction is variable.

8. The method of claim 1, wherein a ratio of the torque at a primary axle to the torque at a secondary axle is set variably as a function of a coefficient of friction between the wheel and underlying surface.

9. The method of claim 1, wherein the distribution of the torque at a primary axle and a secondary axle of the vehicle also takes place in the overrun mode.

10. The method of claim 1, wherein the clutch unit is actuated predictively in such a way that no difference in rotational speed is produced between the primary axle and the secondary axle.

11. An electronic control unit device programmed for the variable distribution of torque between different axles of the vehicle, wherein the device is programmed to carry out at least the following steps:
   (a) determining an available drive torque;
   (b) determining excess torque at the primary axle;
   (c) determining a current maximum torque at the secondary axle; and
   (d) making available the excess torque to the secondary axle in so far as said excess torque does not exceed the current maximum torque;
   wherein the clutch unit is actuated predictively, at least in that one of (a) an engine torque which is requested by the driver is detected and taken into account and (b) no difference in rotational speed is produced between the primary axle and the secondary axle.

12. The device of claim 11, wherein step (a) comprises at least one of the following processes:
   a.1 determining operating parameters of an engine of the vehicle,
   a.2 determining an input torque at the transmission, and
   a.3 determining the available drive torque from the input torque at the transmission.

13. The device of claim 11, wherein step (b) comprises at least one of the following processes:
   b.1 determining a torque which is required at the primary axle or a torque which can be provided, and
   b.2 determining the excess torque taking into account the available drive torque and the torque which can be provided at the primary axle.

14. The device of claim 11, wherein step (c) comprises at least one of the following processes:
   c.1 determining the current maximum torque at the secondary axle taking into account at least one of the following parameters: steering angle, transmission, vehicle dynamics range;
   c.2 determining the current maximum torque at the secondary axle taking into account the coefficient of friction between the wheel and underlying surface,
   c.3 determining the current maximum torque at the secondary axle taking into account a difference in rotational speed between the primary axle and secondary axle, and
   c.4 determining the current maximum torque at the secondary axle taking into account a thrust distribution at all the wheels of the primary axle and secondary axle.

15. The device of claim 11, wherein a coefficient of friction between the wheel and underlying surface serves as a control variable for the distribution of torque to a primary axle and a secondary axle of the vehicle and is adapted abruptly or iteratively as a function of current operating parameters of the vehicle.

16. The device of claim 15, wherein a rate of change of the adaptation of the coefficient of friction is variable.

17. The device of claim 11, wherein a ratio of the torque at a primary axle to the torque at a secondary axle is set variably as a function of a coefficient of friction between the wheel and underlying surface.

18. The device of claim 11, wherein the distribution of the torque at a primary axle and a secondary axle of the vehicle also takes place in the overrun mode.

* * * * *